United States Patent [19]
Trischler et al.

[11] 3,978,493
[45] Aug. 31, 1976

[54] TIME RECORDER

[75] Inventors: Günther Trischler, Plochingen, Neckar; Hartmut Reichert, Esslingen-1-Zell, both of Germany

[73] Assignee: Simplex Time Recorder Company, Gardner, Mass.

[22] Filed: Sept. 9, 1974

[21] Appl. No.: 504,097

[30] Foreign Application Priority Data
Sept. 11, 1973 Germany............................ 2345728
May 17, 1974 Germany............................ 2424146

[52] U.S. Cl.................................. 346/82; 346/84; 346/86; 346/95; 346/133
[51] Int. Cl.$^2$......................................... G01D 15/20
[58] Field of Search.............................. 346/82–86, 346/94, 95, 100, 133

[56] References Cited
UNITED STATES PATENTS

| | | | |
|---|---|---|---|
| 2,389,345 | 11/1945 | Dell et al. | 346/86 |
| 2,773,733 | 12/1956 | Lorenz | 346/84 |
| 2,810,621 | 10/1957 | Hibberd et al. | 346/82 X |
| 3,156,518 | 11/1964 | Bud | 346/86 |
| 3,512,159 | 5/1970 | Clark et al. | 346/86 |
| 3,560,990 | 2/1971 | Inoue | 346/86 X |

Primary Examiner—L. T. Hix
Assistant Examiner—Stanley J. Witkowski
Attorney, Agent, or Firm—Shenier & O'Connor

[57] ABSTRACT

A time recorder with a time controlled printer for recording time data in the lines of a stamping card, with a card slide forming a stop abutment for the stamping card which can be slid into the apparatus in the direction perpendicular to its lines, an electrical circuit including a switch which can be operated by sliding the stamping card to trigger the printing mechanism when the stamping card is in the printing position also with a plurality of stop abutments as a first element for defining the possible positions of the card slide when printing the stamping card and a bolt, adapted to cooperate with the plurality of stops and acting as a second element, both elements being movable relative to each other into an engagement and non-engagement position and one of the elements being associated with the card slide and being slidable therewith in relation to the other element, the two elemets being driven into the engagement position by the stamping card and are slidable in the said engagement position together with the card slide to a stop abutment the switch being actuated on displacement of the element which is not connected to the card slide.

6 Claims, 6 Drawing Figures

TIME RECORDER

This invention relates to a time recorder with a time-controlled printer for recording time data in the lines of a stamping card, with a card slide forming a stop abutment for the stamping card which can be inserted into the apparatus in the direction perpendicular to its lines and is slidable in the aforementioned direction, a switch which can be operated by sliding the stamping card to trigger the printing mechanism when the stamping card is in the printing position also with a plurality of stop abutments as a first element for defining the possible positions of the card slide when printing the stamping card and a bolt, adapted to cooperate with the plurality of stops and acting as a second element, both elements being movable relative to each other into an arrangement and non-engagement position and one of the elements being associated with the card slide and being slidable together therein in relation to the other element.

It is common practice for time recorders, more particularly printing time recorders to print the clock times at which a worker commences work on successive days, in a column of a stamping card associated with the aforementioned worker, namely in lines which follow successively upwardly from below or downwardly from above. The clock times at which the said worker finishes work are then also printed one below the other in an adjacent column of the stamping card.

The prior art however also discloses printing time recorders in which the in-times and out-times of one day are printed one below or above the other into one column of the stamping card. The card slide of all the apparatus of the first kind is time controlled or program controlled more particularly the said card slide is raised or lowered by the amount of one line spacing at specified times of the day between the printing operation.

The prior art also discloses printing time recorders of a second kind with a tracing device for the stamping cards by means of which the line of a column that has been printed last is detected and the next printing position is defined thereby.

In a first well known type of time recorder, the card slide is raised each day by one line space. To this end the known apparatus is provided with two racks with saw teeth which are disposed behind the so-called card funnel, i.e. the path of the stamping card and are disposed adjacent to each other, one of the said racks being raised by one line spacing through an electromagnet and a control pulse which is generated one every day and is then again lowered while the other rack is mounted so as to be stationary with respect to the frame. The card slide is provided with pawls which engage with the racks so that the said slide can be raised by a stroke of the first rack, referred to hereinafter as feed rack, on each day by one line spacing and to prevent the said rack from dropping back under its own deadweight when the feed rack performs its resetting motion. A bracket which is mounted in a position that is fixed with respect to the frame in the region of the top ends of the racks finally functions as a detent mechanism which thrusts the pawls out of the racks so that the card slide is able to drop back into its bottom starting position. The said card slide supports an electric switch which can be operated by the bottom edge of the stamping card to trigger the printing mechanism. Teeth of the feed rack on which one pawl of the card slide normally bears therefore defines the possible printing position of the stamping card so that the insertion of a stamping card into the known printing time recorder merely causes the printing mechanism to be triggered by the above mentioned switch. A disadvantage in this known time recorder is not only the presence of a large number of levers, pawls and the like but also the fact that the card slide must entrain a cable because the switch for triggering the printing mechanism is mounted thereon and that stamping of the clock times in the correct lines cannot be ensured with reliability: If a stamping card is inserted into the known time recorder while the feed rack is in the process of performing a stroking motion it would be perfectly feasible for printing to be performed between two lines which has a negative effect when the stamping cards are to be automatically evaluated in a clear-language reader.

This also applies to a second known time recorder of the kind mentioned previously in which a spindle is rotated through a defined angle once every day by means of an indexing mechanism. A gearwheel with two recesses along its circumference is mounted on the said shaft and meshes with a rack which supports the card slide. If one of the recesses of the gearwheel is positioned opposite to the rack the latter together with the card slide is able to drop back under its own deadweight into a bottom starting position. An electric switch, actuated by the bottom edge of the stamping card and triggering the printing mechanism is also provided on the card slide in this known time recorder. The disadvantage of the card slide having to entrain a cable and that the printing operation must be performed while the card slide moves from one printing position into the adjacent position therefore also applies to this printing time recorder.

Details of the known printing time recorder are disclosed in the Japanese Pat. Specification No. 463 309 and in the Japanese Utility Model Specification No. 923 428 by Messr. Amano.

Finally, the German Offenlegungsschrift No. 2 156 852 discloses a time recorder of the second previously mentioned kind. In this known printing time recorder the last printed impression is detected by optical tracing means in this known printing time recorder when a stamping card is inserted into the apparatus, i.e., it defines the line in which the last printed impression was made. A series of stop abutments disposed one below the other and each being associated with an electromagnet in order to pull the stop abutments individually out of the path of the card slide are provided for the said card slide which is moved downwardly from above by the insertion of the stamping card into the apparatus against the action of a restoring force. These electromagnets are controlled by the optical tracing device so that the card slide can be moved passed the retracted stop abutments in accordance with the last line that was printed as far as the first stop abutment which has not been retracted. The bottom of the card slide is provided with a limit switch which triggers the printing mechanism when striking against the first stop abutment which has not been retracted from the path of the card slide. Apart from the fact that the aforementioned publication merely discloses apparatus of the previously explained second kind and the known construction suffers from the disadvantage that this card slide must also entrain a cable because of the switch mounted on the said card slide, the known construction is exceptionally complex because it requires as many electromagnets as the stamping card has lines.

It is an object of the invention to improve a time recorder of the kind described hereinbefore, i.e., with a plurality of stops and a bolt cooperating therewith for positioning the card slide so that the construction principle can be applied to the apparatus of both previously mentioned kinds and which avoids the disadvantage of the card slide having to entrain a cable. To this end and according to the invention both elements, i.e., the plurality of stop abutments and the bolt can be driven by the stamping card into the engagement position in which they are slidable, together with the card slide, to a fixed stop abutment and the switch for triggering the printing mechanism can be actuated by the element (plurality of stop abutments or bolts) which are not connected to the card slide. As a result of this construction principle the switch can be mounted in a position which is fixed with respect to the frame and since the switch can moreover be operated only when the bolt and the plurality of stop abutments are engaged with each other triggering of the printing mechanism is forcibly preceded by the selection of the printing position, i.e. of the line in the stamping card into which printing is to be preformed. It is therefore impossible to print between lines when using the construction according to the invention, even applied to time recorders of the previously mentioned first kind. Furthermore, the construction according to the invention is exceptionally simple and the possible printing positions of the stamping card or of the card slide can be defined particularly simply and precisely because these printing positions are defined by the positioning element which is not connected to the card slide and can be easily and simply adjusted.

If the basic idea of the invention is applied to apparatus of the second kind in which the stamping card is traced in order to define the last printed line the stamping card will drive the bolt and plurality of stop abutments into the engagement position through the appropriate tracing device. To this end it is possible for perforations, embossings or the print itself on the stamping card to be traced. If the construction principle according to the invention is applied to time recorders of the first kind in which the card slide is lowered or raised by time or program control it is merely necessary for the time or program control to adjust the card slide approximately because the precise printing position is defined by the engagement of the bolt into the plurality of stop abutments or it is defined by the position of the said stop abutments in this series so that displacement of the card slide in accordance with the time or program can be accomplished relatively simply and inexpensively.

It is obvious that in the same way as in the known apparatus of the second kind it is sufficient in a construction according to the invention to drive only one stop abutment of the plurality of such stop abutments into the engagement position in order to define the printing position of the stamping card. If the card slide supports the bolt in such a case the biased stop abutment will entrain the entire plurality of stop abutments thus actuating the switch for triggering the printing mechanism.

As disclosed by the known apparatus of the second kind the second element for positioning the card slide is designated as a bolt but need not necessarily have the function of the bolt since it may also be a stop abutment which cooperates with the stop abutment of the stop abutment series.

A particularly simple embodiment of apparatus according to the invention of the first kind, i.e. with a time or program controlled drive for displacing the card slide, is characterised in that the element associated with the card slide can be brought into the engagement position by the bottom zone of the stamping card against the action of a restoring force and by the provision in the drive of a resilient element. The last mentioned element is necessary to enable the card slide to be advanced to the appropriate stop abutment of the series even if the time controlled or program controlled drive has been shut down. The restoring force for the element mounted on the card slide may be its own deadweight or its restoring spring.

Basically it is feasible to mount the pluralilty of abutments, more particularly in the form of a rack, on the card slide and to mount the bolt in a position which is fixed with respect to the apparatus, the rack being displaced towards the bolt, for example by the bottom card edge, if the stamping card is thrust against the card slide. Embodiments in which the bolt is associated with the card slide and the plurality of stop abutments more particularly constructed as a rack, operates the switch for triggering the printing mechanism are however preferred. A construction which is particularly reliable and protects the bottom edge of the stamping cards is provided with a two armed lever which is pivotally supported in the card slide and functions as bolt, one arm cooperating with the bottom edge of the stamping card and the other arm cooperating with the plurality of stop abutments.

A lever of this kind can be adjusted with small forces and locking between the rack and lever is self-latching once the lever bears against the steep flank of one of the saw teeth of the rack so that the entire region of the bottom stamping card edge which bears against the card slide is utilised for applying the force which is required to displace the rack against a restoring force in order to operate the switch.

In time recorders of the first kind in which the printing position is preselected, at least approximately by the time control or program control, one of the two elements could also be moved into the engagement position by electric or electromagnetic means if it is possible to dispense with the advantage of not having to mount an electric switch on the card slide. A construction of this kind would also provide substantial advantages because it ensures that printing is performed always in a line and never between lines.

The invention will now be described by way of example with reference to the accompanying drawings, wherein.

The following description relates to a printing time recorder whose card slide is lowered once every day by one line; the lines of the stamping cards are thus allocated to the days of the month. It is however perfectly feasible to allocate the lines of the stamping card only to the days of the week or to the in-times or out-times; this is merely a question of the time control or program control for the card slide. Instead of being lowered by one line spacing the card slide could also be raised and finally it is possible for the time control or program control to deliver several pulses so that specific lines can be jumped, for example, for months with only 28 or 30 days.

Figures 1A, 1B, 2A:
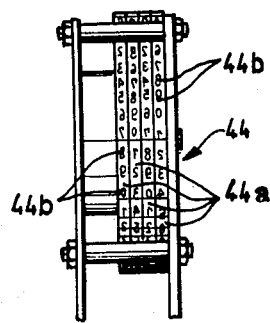
FIGS. 1a and 1b show the front and rear of a stamping card for the time recorder.
FIG. 2a is a diagrammatic front view of the type head of the printing mechanism.

As indicated in FIGS. 1a and 1b stamping card 10 which is suitable for the illustrated embodiment of the time recorder (printing time recorder) according to the invention is provided with 16 lines 16 on its front and on its rear 12 or 14 respectively, the bottom line of the front remaining empty, the penultimate to the first line of the front 12 being allocated to the first to 15th day of the month and the bottom to top lines of the rear side 14 being allocated to the 16th to 31st day of a month. The columns 18 of the stamping card are allocated from left to right to the clock times at which a specific worker commences work in the morning, interrupts work, for example during a break in the morning, a mid-day break and a break in the afternoon and finally terminates work in the evening.

Figure 2:
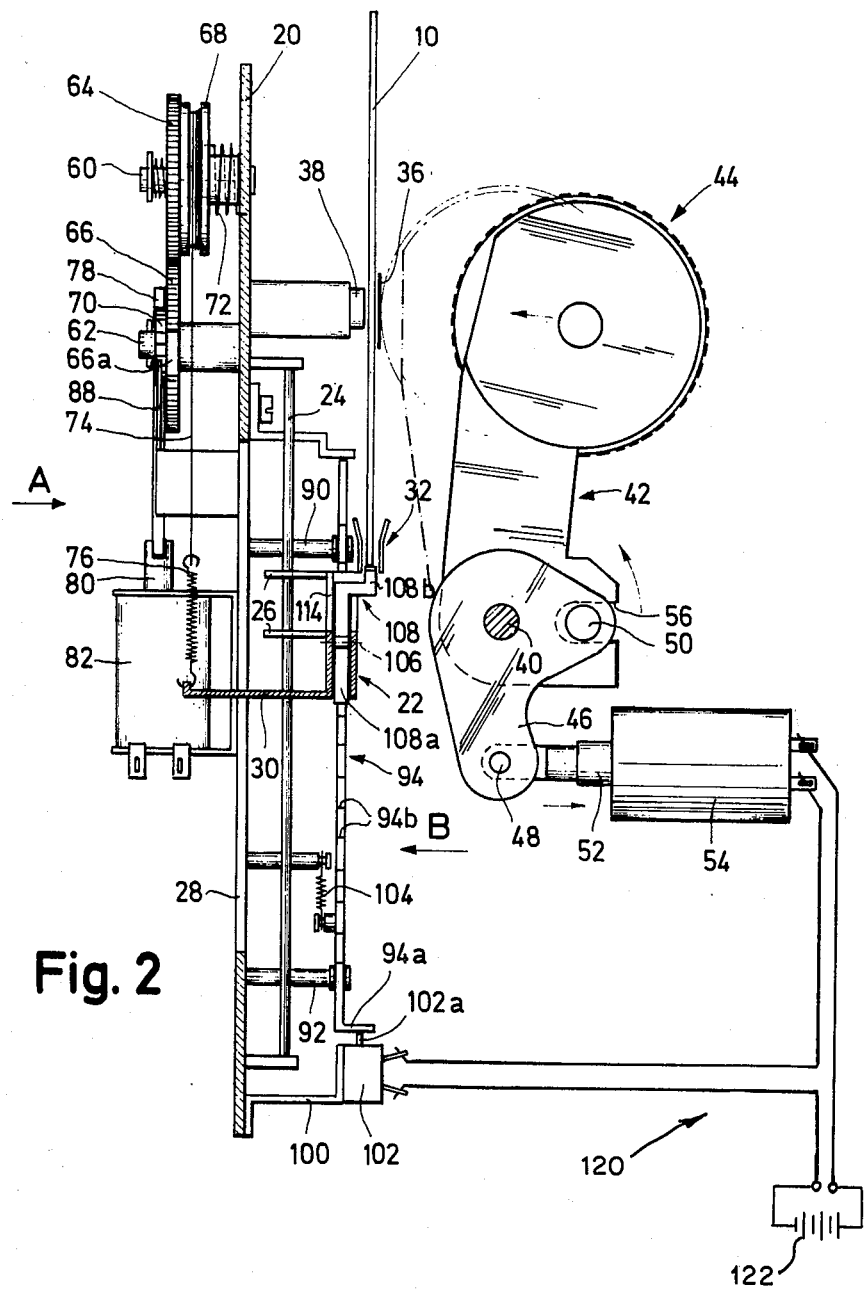
FIG. 2 is a side view of the rear wall of the apparatus together with the printing mechanism and a stamping card which is inserted into the apparatus.
Figure 4:
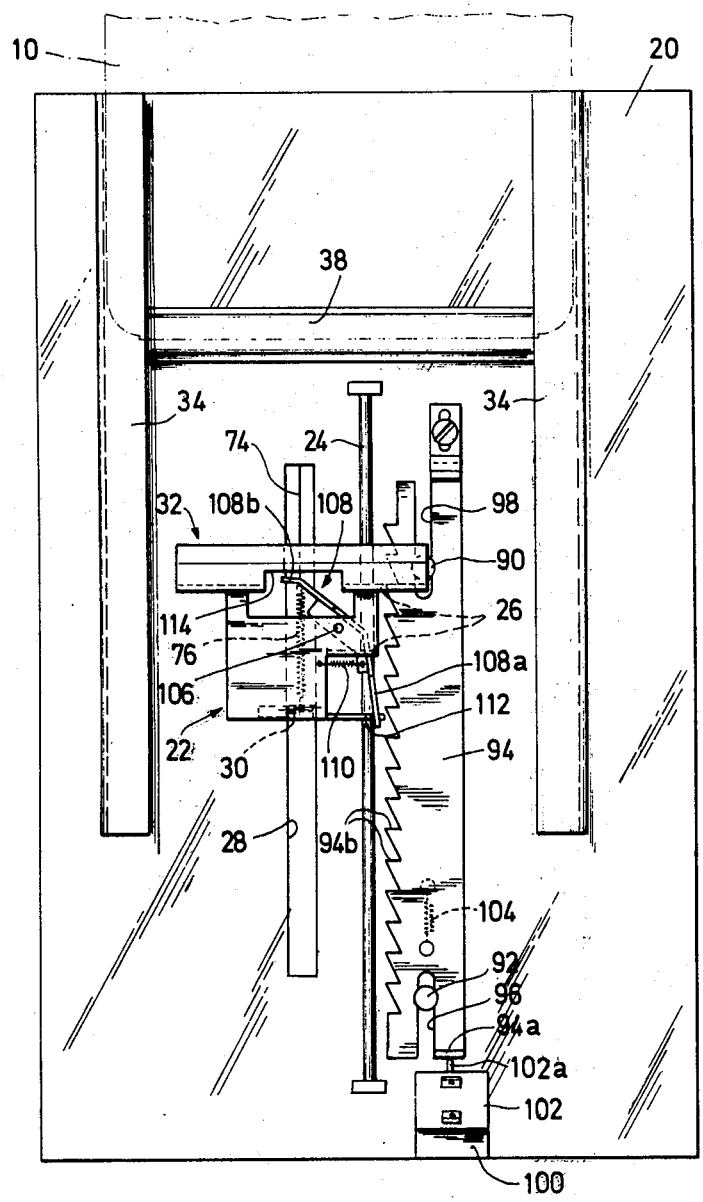
FIG. 4 is a view of the rear wall from the front as seen in accordance with the arrow B of FIG. 2.

According to FIGS. 2 and 4 a card slide, referenced in its entirety with the numeral 22, is mounted on a rear wall 20 of the apparatus so as to be slidable in the vertical direction, to this end a guide rod 24 is mounted on the rear wall 20 and extends through apertures, not shown into two lugs 26 of the card slide. The rear wall 20 is also provided with a guide slot 28 through which an arm 30 of the card slide extends. At the position 32 the card slide forms a support for the stamping cards 10 for whose lateral edges there are guide rails 34 mounted on the rear wall 20. The stamping cards are thus inserted into the apparatus according to the invention between an inking ribbon 36 indicated in FIG. 2 and a rubber strip 38 which is mounted on the rear wall and forms the abutment for the printing or stamping operation.

A guide rod 40 on which the carrier 42 of a typehead 44 can slide is mounted on apparatus side walls which are not shown; the said carrier can also be pivoted about the guide rod 40. The typehead is provided with a plurality of adjacently disposed rotatable rings 44a the circumference of which support numeral types 44b (see FIG. 2a). Bell cranks 46 which are pivotable around the guide rod are provided in the end zones of the said guide rods and are connected to each other by means of two bars 48 and 50. The armature 52 of electromagnet 54 which is fixed with respect to the frame is hinged to the bar 48 while the bar 50 engages in a cutout 56 of the carrier 42. If the electromagnet 54 is energised the typehead 44 is therefore pivoted in accordance with FIG. 2 from its position shown in solid lines into the position indicated in dash dot lines, the particular printing types facing the stamping card 10 printing a clock time on the said card which has just been inserted since the typehead 44 is controlled and adjusted through means well known in the art of time recording device manufacture. The typehead 44 may be provided with an indexing device which is also known and therefore not shown for indexing the numeral rings 44a, the indexing device being actuated, for example at intervals of 1 minute, by pulses delivered aforesaid clock. Typehead 44 is moved along the guide rod 40 during the course of the day, and is reset so that the line in the first column is always imprinted at the beginning of a new day, by means of a conventional clock-connected mechanism well known in the art. Since this feature constitutes no part in this invention and is well known to those skilled in the art, it will not be further elaborated upon.

Figure 3:
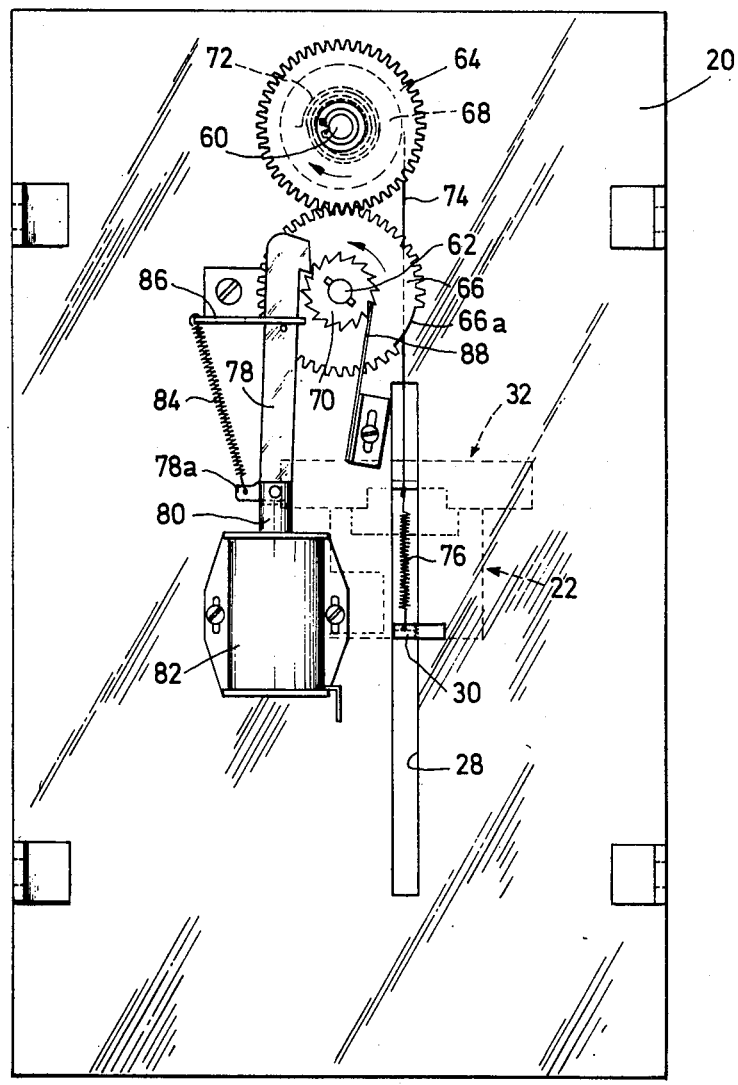
FIG. 3 is a view of the rear wall as seen from the rear in accordance with the arrow A of FIG. 2.

The card slide 22 is lowered daily by the distance between two lines 16 of the stamping cards by means which are disposed on the rear of the rear wall 20. To this end two meshing gearwheels 64 and 66 are rotatably supported on two studs 60 and 62, one of the gearwheels being fixedly coupled to a cord pulley 68 and the other being fixedly coupled to a ratchet wheel 70. A coiled spring 72, the ends of which act on the cord pulley 68 and on the rear wall 20, is also mounted on the stud 60 and tends to rotate the cord pulley 68 and the gearwheel 64 in the anticlockwise direction according to FIG. 3. A cord 74 is coiled in the clockwise direction according to FIG. 3 on the cord pulley 68; one end of this cord is attached to the cord pulley 68 the other end acting on a helical spring 76 which is attached to the arm 30 of the cord slide.

The ratchet wheel 70 which is provided with 16 teeth is indexed in the anticlockwise direction in accordance with FIG. 2 by means of a pawl 78 which is hinged to the armature 80 of an electromagnet 82 that is mounted on the rear wall 20 and is biased by a tension spring 84 one end of which acts on an arm 78a of the pawl 78 and the other end of which acts on a guide bracket 86 which has a guide slit, not shown, for the pawl 78 and is mounted on the rear wall 20. The pawl 78 is therefore always maintained in mesh with the ratchet wheel 70 with which a ratchet spring 88 cooperates that is also mounted on the rear wall 20.

The gearwheel 66 is provided with a cut out 66a without teeth, the length of which is such that after every 16 indexing step of the indexing transmission comprising the pawl 78 and the ratchet wheel 70 the aforementioned cut out is positioned opposite to the gearwheel 64 so that the latter is able to rotate freely but is again entrained by the gearwheel 66 at the next indexing step of the indexing mechanism.

A rack 94 is retained so as to slide in the vertical direction on two guide pins 90 and 92 which are mounted on the rear wall 20. To this end the rack is provided with two slots 96 and 98 through which the guide pins extend. A microswitch 102 is mounted on a bracket 100, a base 94a of the rack 94 bearing on the switch pin 102a of the said rack. To prevent the microswitch 102 being actuated by the deadweight of the rack 94 itself it is possible to provide a relief spring 104 to act at the bottom end of the said rack. Stop abutments can also be provided for the rack to limit the travel thereof; the microswitch 102 in fact functions as a fixed stop abutment which limits the downward travel of the rack 94. The rack is provided with saw teeth 94b whose horizontal flanks are disposed at the top. A double-armed lever 108 which is pivotably supported on a pin 106 in the card slide 22 cooperates with the aforementioned teeth and one arm 108a forms a bolt which is able to engage with the rack while the other arm 108b cooperates with the bottom edge of the stamping cards 10 and is therefore slightly bent. In the illustrated embodiment the lever 108 is biased by the action of a tension spring 110 which pivots the lever in the clockwise direction according to FIG. 4 until the lever arm 108a bears against a stop abutment 112 of the card slide. In this position, which is shown in FIG. 4, the arm 108b which engages in a cut out 114 of the card support 32 of the card slide, projects upwardly above the base of the card support so that the lever 108 is pivoted in the anticlockwise direction by a stamping card 10, according to FIG. 4, which is inserted into the apparatus before the bottom edge of the stamping card 10 strikes against the base of the card support 32. As a result of the pivoting motion the arm 108a of the lever 108 moves into the zone of the teeth 94b of the rack 94.

It should be added that the distances between horizontal flanks of the teeth 94b of the rack correspond to the line spacing of the stamping cards 10 and that the travel of the card slide 22 is limited by appropriate stop abutments so that when the card slide is in the top limiting position the bottom line of the lines 16 of the stamping cards is positioned in front of the typehead 44 while printing in the top line of the stamping card proceeds when the card slit is in the bottom limiting position.

A conventional clock-connected impulse source, well known to those skilled in the art and therefore not shown in the drawings, delivers one pulse daily to the electromagnet 82, preferably at midnight, so that the card slide 22 is lowered daily by approximately one line spacing on the basis of the selected transmission ratio between the gearwheels 64 and 66 and the cord pulley 68. When a stamping card is inserted into the apparatus the lower edge of the stamping card pivots the arm 108a of the lever 108 between two teeth 94b of the rack and further insertion of the stamping card into the apparatus causes the bottom edge thereof to finally bear against the base of the card support 32 whereupon the card slide 22 is pushed downwardly against the action of the helical spring 76 until the free end of the arm 108a bears against the horizontal flank of the next lower tooth 94b, entraining rack 94. Upon further insertion of the stamping card 10, card slide 22 and rack 94 move conjointly. Since base 94a of rack 94 bears lightly against actuating pin 102a of microswitch 102, only a very slight movement of rack 94 is required to actuate the microswitch.

This will then close an electrical circuit 120 (FIG. 2) between a current source 122 and electromagnet 54, causing the electromagnet to retract armature 52 thereby pivoting typehead 44 counterclockwise about guide rod 40 and causing the imprint of the time entry.

The different printing positions for the stamping cards 10 are precisely defined by the predefined positions of the horizontal flanks of the teeth 94b and a fixed or adjustable stop abutment for the bottom limiting position of the rack 94 so that any elongation of the cord 74 on which the card slide 22 is suspended does not play any important role. Furthermore, daily adjustment of the position of the card slide by means of the indexing mechanism 78, 70 and the gearwheels 64 and 66 need only be approximate because precise adjustment of the appropriate printing position is provided by the lever 108 and the rack 94.

Finally, it is not possible to print between lines 16 in the apparatus according to the invention because correct stamping in the appropriate lines is ensured even if the electromagnet 82 is actuated by the program control system and the precise moment at which the printing operation is triggered by the microswitch 102 since engagement of the lever 108 of the card slide with the rack 94 and the resilient helical spring 76 causes any operating motion of the cord 74 to remain ineffective.

The apparatus is of course adjusted so that the next indexing operation of the indexing mechanism 78, 70 positions the cut out 66a of the gearwheel 66 opposite to the gearwheel 64 whenever the card slide 22 has assumed its bottom limiting position in which the uppermost of the lines 16 of the stamping cards is positioned opposite to the typehead 44 so that the gearwheel 64 is able to rotate freely. The coil spring 72 will then again raise the card slide into its top limiting position from which the next indexing step of the indexing mechanism 78, 70 begins to lower the card slide 22 because the gearwheel 66 then again commences to mesh.

What we claim is:
1. In a time recorder, apparatus including:
   a. Printing means for recording time information entries on lines of a record medium inserted into said recorder in a direction perpendicular to said lines;
   b. control means for actuating said printing means when the record medium is properly positioned within the recorder, comprising:
      1. a first member having a series of spaced stops corresponding to the number of lines on said record medium to be imprinted,
      2. a second member capable of engaging and disengaging said stops on said first member, one of said members, when both are disengaged, being capable of movement with the record medium as it is inserted, the other member remaining stationary relative thereto, and both members, when engaged as a result of the record medium having been inserted to a proper position, being capable of slight conjoint movement; and
      3. a switch actuatable by said slight conjoint movement of said first and second members to trigger said printing means.

2. Apparatus as in claim 1, including means for biasing that member remaining stationary relative to the movement of the other member with the record medium as it is inserted.

3. Apparatus as in claim 1 in which said first member is a rack and in which said stops are saw teeth on said rack.

4. Apparatus as in claim 1 including a slide and means mounting said second member on said slide.

5. Apparatus as in claim 1, including a slide, means mounting said second member on said slide, means for biasing said second member to a disengaged position with said first member, said second member being movable by said record medium into engagement with said first member, and positioning means comprising a drive having a resilient element therein for moving said slide to a predetermined initial position.

6. Apparatus as in claim 5 in which said second member is a lever pivotally supported on said slide, one arm of said lever cooperating with the edge of said record medium and the other arm of said lever cooperating with said stops.

* * * * *